United States Patent Office 3,022,213
Patented Feb. 20, 1962

3,022,213

CONDUCTIVE WEB AND METHOD OF MAKING SAME

Donald K. Pattilloch, New York, and Carl Polowczyk, Elmhurst, N.Y., assignors to Michigan Research Laboratories, Inc., Long Island City, N.Y., a corporation of Michigan, and Electro-Chem Fiber Seal Corporation, New York, N.Y., a corporation of Delaware No Drawing. Filed Feb. 13, 1958, Ser. No. 714,957
12 Claims. (Cl. 162—138)

This invention relates to the production of electrically conductive webs in which electrically conductive particles are incorporated in a fibrous web.

The conductive webs of the present invention find their principal use in the manufacture of laminated conductive panels and other structural shapes. Recently, it has been discovered that a porous, electrically conductive structure can be formed in one or more of the lamina prior to lamination to provide a dense homogeneous laminate having an electrical heating function in addition to the protective and decorative functions of the conventional laminates. The present invention is an improvement in the production of conductive sheets which may be laminated to produce conductive panels and structures.

One object of the invention is to provide laminates for superior electrically heatable structures. Still another object of the invention is to improve the method of making the conductive lamina to be used in said structures for thereby improving the quality of said laminated structures. More specifically, it is an object of this invention to provide a better distribution of conductive materials on the fibers of the web, and when desired, a laminating resin in addition to said conductive material. A further object of the invention is to increase the efficiency and range of operation of electrically conductive laminated structures produced from webs made according to the invention. Other objects will be more readily apparent from the following description of the invention.

In general, the objects of this invention are accomplished by forming a conductive web by conventional paper-making procedures from an aqueous suspension containing fibers which may be organic or inorganic fibers. Such fibrous suspensions include cellulose, asbestos, asbestos-glass mixtures, asbestos-cellulose mixtures, cellulose-glass mixtures, and the like. The method generally comprises treating an aqueous suspension of fibers with a condensation product of dicyandiamide and formaldehyde, treating the suspension with a colloidal silica and thereafter adding a finely divided conductive material and then forming the suspension into a web by paper-making techniques. If it is desired to incorporate a laminating resin into the web, a powdered resin is dispersed in the colloidal silica before addition of the latter.

A simplified flow diagram of a process of this invention is as follows:

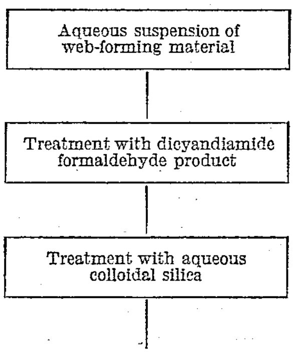

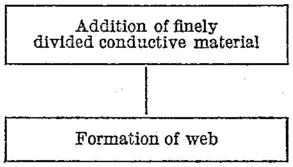

The use of inorganic fibers is desirable where the temperatures encountered are above the decomposition point of cellulose. Cellulose may be used for low temperature applications and where greater web strength is required. It is believed that the short-fibered asbestos present in asbestos paper-making fibers bear the same electrical charge as cellulose.

The laminating resin which may or may not be incorporated in the electrically conductive web may be any of the various thermosetting resins heretofore used in the manufacture of laminates of this type so long as the resin does not carbonize at the temperature at which the structure is designed to operate. However, the preferred resins are thermosetting materials such as B-stage phenolic resins. An important part of this invention involves dispersing a powdered resin in the colloidal silica solution. One advantage of this is that on subsequent lamination under heat and pressure, the flow of the resin in the conductive layer enables the firm bonding of such layers to each other and to superposed lamina.

Examples of conductive materials which may be used in this invention include powdered zinc and graphite. The graphite used as an electrical conductor may be added either in the form of a water dispersion or as a dry powder, but it must be in a finely divided form, preferably no larger than 200 mesh.

In the formation of the conductive fibrous webs in accordance with this invention, it is important to use a colloidal silica and it is especially advantageous to disperse the resin, if any, in the silica solution prior to addition to the activated fiber suspension. Suitable types of colloidal silica include Ludox and Syton. The former is the trademark of E. I. du Pont de Nemours and the latter is the trademark of Monsanto Chemical Company.

Ludox is a well-known type of colloidal silica and is generally composed of 29–31% $SiO_2$, 0.29–0.39% $Na_2O$, a maximum of 0.15% sulfates as $Na_2SO_4$ and balance water. This invention may be carried out by using Ludox-type colloidal silica prepared in accordance with any of the United States Patents Nos. 2,224,325; 2,574,902 and 2,597,872. It appears that an important property of this type of colloidal silica is that alkali is present as a stabilizer for the silica sol and is not uniformly distributed throughout the silica particles as it is in conventional silicates such as water glass, but is substantially all outside the silica particles.

The treatment of the aqueous fibrous suspension with dicyandiamide-formaldehyde condensates is hereafter referred to as "activation," the condensate being referred to as the "activator." It is believed that the activator bonds the colloidal silica and the resin, if any, to the fibers by electrostatic or chemical interaction. An example of a dicyandiamide-formaldehyde condensate is Lyofix SBK sold by Ciba Company. It is a 30% aqueous colloidal solution of dicyandiamide-formaldehyde condensate.

In carrying out this invention, conventional procedures may be followed in the formation of the non-conductive layers of the finished laminate. Suitable resin-impregnated paper layers may be used. Conventional decorating techniques may be employed and a clear, hard plastic top and/or bottom may also be incorporated. However, preferred overlays are those containing resins which will not alter the resistance of the conducting layer on lamination. If a phenolic resin, for example, is incorporated in the conductive web, cellulosic webs containing the same resin, such as those prepared as disclosed in Pattilloch S.N. 656,223, filed May 1, 1957, are preferred since the presence of the same resin in both the conductive web and the insulating overlay insures that resin migration will not affect the conductivity of the conductive lamina. For higher temperature applications, an insulating overlay prepared from inorganic fibers is preferred. Such webs may be produced according to the invention by activating an aqueous suspension of asbestos fibers, for example, with dicyandiamide-formaldehyde condensate, adding a powdered thermo-setting resin dispersed in colloidal silica and then forming the suspension into a web.

The conductive web of this invention containing no resin may be saturated or impregnated with a laminating resin or an elastomer that will function at the operating temperatures.

In the manufacture of electrically conductive structures, it is, of course, necessary to provide electrodes for electrical contacts with the conductive surface. These electrodes may be attached during the lamination or at other suitable times by bonding a copper strip to opposite edges of the laminate. One suitable method of doing this is to coat and secure the copper electrodes with a compatible adhesive such as polyvinyl butyral. In such instances during the lamination step, the adhesive is forced away from the copper sufficient to permit electrical contact with the conductive layer.

In one preferred embodiment utilizing phenolic resins, zinc dust is added to either the conductive layer containing graphite or the overlay layer. The advantage of the zinc dust is that it permits a higher temperature of operation while maintaining electrical stability. For example, it has been found that as little as 0.125 pound of zinc for each 25 pounds of asbestos will permit an increase in range of operating temperatures from 200° F. to 400° F.

*Example I*

25 pounds of grade CR–5 asbestos was furnished to a hydro-pulper and suspended in water to form a 5% to 10% solids dispersion. While still under agitation, 2.5 pounds of Lyofix SBK (0.75 pound dry basis) was added and agitation was continued for five minutes while the water became very cloudy. Then there was added 25 pounds of powdered B-stage phenolic resin dispersed in 17.5 pounds of Ludox and diluted to 50% solids. The phenolic resin is a cresol modified phenol formaldehyde resin having a melting point of 190–195° F., a gel-time of 100 seconds at 60° C., a setting temperature of 300–325° F. and it is used as a 200 mesh powder.

Agitation was continued for one minute and the water cleared. Then 23 pounds of 200 mesh graphite was added to the suspension and agitation was continued for an additional minute. Thereafter, the suspension was diluted to 0.1–0.5% consistency and fed to a one-cylinder web machine where it was formed into a sheet of about 1/16 of an inch in thickness by progressively rotating the cylinder and forming a thickness of about 10 mils per turn. The thus formed sheet was air dried and laminated with pre-formed overlay asbestos sheets of Example III under a pressure of between 1,000 and 1,200 pounds per square inch at a temperature of 300° to 325° F. for about 20 minutes. The finished board exhibited no resin migration at the edges, the edges did not require trimming and it was found to have a resistance of about 40 ohms per square.

*Example II*

6.5 pounds of asbestos, grade CR–5, was placed in a hydro-pulper with 100 pounds of water and 300 grams of 30% Lyofix SBK (90 grams dry basis) was added to the aqueous suspension. After about 5 minutes agitation, there was added to the mixture 6/12 pounds of powdered silicone resin R–5071 (a solid copolymer of monomethyl siloxane, dimethyl siloxane and phenyl siloxane sold by Dow Corning) dispersed in 4.5 pounds of Ludox and diluted to 50% solids. After one minute's further agitation, 7.8 pounds of 200 mesh graphite was added to the suspension. After a short period of agitation, the suspension was diluted to a web-forming consistency and a web of about 1/8 of an inch was formed as in Example I. The newly formed web was dried at about 110° C. until the moisture content had been reduced to 5%–8%. The sheet was then ready for lamination in accordance with the procedure set forth in Example I. Laminates were then prepared from the product of this example with special overlay described in the following examples and with plain overlay sheets of ordinary construction, and in each instance, a satisfactory product was obtained. In the lamination, the procedure of Example I was followed except that because of the silicone, the finished product was post-cured under pressure at 400° F. for 3–5 hours after lamination.

*Example III*

An overlay sheet especially useful with the conductive sheets produced in accordance with Examples I and II was prepared in the following manner. 25 pounds of asbestos, grade CR–5, was placed in a hydro-pulper with enough water to form a 5% solution. 2.5 pounds of Lyofix SBK 0.75 pound solids) were added and the suspension was agitated for about 5 minutes. Thereafter, 12.5 pounds of powdered B-stage resin of Example I, 1.25 pounds chrome green, 0.075 pound phthalocyanine blue, and 0.125 pound zinc dust dispersed in 1.25 pounds of Ludox and diluted to 50% solids were added. After a short period of additional agitation, the suspension was diluted to a web-forming consistency and a web was formed as in Example I. Thereafter, a single web of Example I was laminated as described in Example I between two webs as produced in this example with a copper electrode strip at opposite ends of the laminate. The electrode strip was secured to the layers prior to lamination with a polyvinyl butyral adhesive. The finished product was characterized by an absence of migrated resin at its edges, the capacity for operating at 400° F., an attractive green surface, a good tensile strength and high impact strength.

*Example IV*

Another overlay sheet was formed by placing 25 pounds of asbestos in a hydro-pulper with sufficient water to make a 5% suspension and 0.75 pound Lyofix SBK (0.225 pound solids). After 5 minutes' agitation, 16.6 pounds of Bakelite resin 4135 and 60 grams of phthalocyanine blue dissolved in 2.5 pounds of Ludox and diluted to 30% solids were added to the suspension. Agitation was continued for a few minutes after which the suspension was diluted to web-forming consistency and a web was formed in the same manner as in Example I. A laminated panel was then formed from a sheet produced in accordance with Example I, overlayed on each side with a sheet produced in accordance with this example and further overlayed on each side with a clear melamine formaldehyde resin sheet. Lamination was carried out as in Example I and a satisfactory product was obtained. However, in the absence of the zinc, the board did not have a capacity for operating at temperatures as high as the board of Example III.

*Example V*

Unbleached kraft pulp (1080 pounds, dry basis) was charged to a beater and beat for 20 minutes. Then 21.6 pounds Lyofix SBK (dry basis) diluted with water to 60 gallons was added and beating continued for 30 minutes. Thereafter 230 pounds Ludox (30% $SiO_2$) were diluted with water to 60 gallons and beating continued for 20 minutes. Then 1550 pounds of grade 38 Acheson graphite was added at nip of the beater roll and beating continued for 20 minutes. The contents were dumped into a beater chest, lightly brushed in a Jordan and fed to the machine chest. The freeness at this point was 600 (Canadian standard).

The pulp was fed to a single cylinder machine operating at 100 ft. per minute. The resulting sheet had an average caliper of .025 inch, resistance of 150 ohms per square, and a basis weight of 40 pounds.

The above conductive sheet may be saturated with a laminating resin for the preparation of conductive laminates.

*Example VI*

An asbestos conducting sheet was prepared on a two-cylinder web machine with a make up roll. The furnish contained:

| | Lbs. |
|---|---|
| Asbestos | 350 |
| Lyofix SBK | 35 |
| Ludox (30% $SiO_2$) | 245 |
| Graphite | 420 |

The asbestos was mixed with water and beat 20 minutes. The activator was added in the form of a 20% aqueous solution and beating continued for 20 minutes. The Ludox was diluted 4 to 1 with water, added and beating continued for 10 minutes. Graphite was then added and the beating continued for an additional 10 minutes. Ten pounds defoamer (fatty acid-glycolester was added).

Sheets having an average caliper of .036 inch, 45" x 50" were prepared and air dried. After aging one week the sheets were oven dried. The sheets had a resistance of 100 ohms per square. They may be saturated with a laminating resin for the preparation of conductive laminates.

*Example VII*

Laminating sheets were prepared according to the method of Example I from a furnish of unbleached kraft pulp containing the following (dry weight based on the dry weight of the untreated pulp):

| | Percent |
|---|---|
| Lyofix SBK | 3 |
| Ludox | 25 |
| Powdered cresol-modified phenol formaldehyde laminating resin | 50 |
| Graphite | 120 |

The resulting sheets are suitable for making conductive laminates.

*Example VIII*

Cellulosic laminating sheets were prepared according to the method of Example I from a furnish of unbleached kraft pulp containing the following (dry weight on basis of dry weight of the pulp):

| | Percent |
|---|---|
| Lyofix | 3 |
| Ludox | 25 |
| Resin of Example VII | 100 |
| Graphite | 140 |

The resulting sheets are suitable for preparing conductive laminates.

*Example IX*

Asbestos was slurried in water to form a 5% suspension. After beating for 10 minutes, 3% Lyofix was added and beating continued for 15 minutes. Then 60% Ludox (30% aqueous $SiO_2$) was added, beating continued for 5 minutes and 300% zinc dust dispersed in water. Hand sheets were formed. The sheets were dried at 120° and thereafter fused at 1000° F. for two hours. The sheets were conductive and had a resistance of 80 ohms per square. They may be impregnated with laminating resins.

The conductive webs of the invention may thus be prepared according to conventional paper-making techniques. Such webs may include a laminating resin, such as thermosetting phenolic resins or curable crosslinked alhyl or aryl siloxanes, which may be incorporated in the pulp before the web is formed. The conductive webs may be utilized for low temperature operation in the case of cellulosic webs or very high temperature operation in case of asbestos or glass base webs.

It will be clear that the overlay of Examples III and IV may be used with conductive layers other than those produced in accordance with Examples I and II and V–IV, although not necessarily with equivalent results. It may also be used as a high temperature resistant overlay for producing non-conductive laminates.

In operation in accordance with this invention, the zinc dust may be added either to the overlay layer or the conductive layer or both, as preferred. It does not appear to adversely affect the electrical resistance of the finished panel, but it does permit operation at higher temperature in either event. When the zinc is used in the conductive layer, it has been found desirable to add it after the resin is added or along with the resin but before the graphite is added.

While the invention has been described in terms of the best mode of operation, it will be obvious to those skilled in the art that certain changes from the examples may be made without departing from the scope of the invention.

For example, the resistance may be reduced by increasing the thickness of the conductive layer or by increasing the relative amount of graphite or by including a plurality of conductive layers in the final laminate. Similarly the relative quantities of silica, resin and activator may be varied within reasonable limits. From 0.5% to 5% of activator may be used; from 30% to 150% of resin may be used; from 1% to 40% of silica may be used; and up to 300% of graphite may be used (all percentages are solids basis on the dry weight of the fibers).

Other changes and modifications within the scope of the invention defined in the claims will be apparent to those skilled in the art.

What is claimed is:

1. The process for the preparation of an electrically conductive web comprising treating an aqueous suspension of fibrous web-forming material with a dicyandiamide formaldehyde condensation product in an amount of 0.5–5%, treating the suspension with an aqueous colloidal silica solution containing from 1–40% of silica, adding a finely divided conductive material in an amount up to 300% and forming the resulting suspension into a web, said percentages are based on solids on the dry weight of said web-forming material.

2. The process as set forth in claim 1 wherein the fibers comprise asbestos.

3. The process as set forth in claim 1 wherein the fibers comprise cellulose.

4. The process as set forth in claim 1 wherein said conductive material is graphite.

5. The process set forth in claim 1 wherein said conductive material is zinc.

6. The process for the preparation of an electrically conductive laminating sheet which comprises treating an aqueous suspension of fibrous web-forming material with a dicyandiamide formaldehyde condensation product in an amount of 0.5 to 5%, treating the suspension with a thermosetting resin in an amount of 30 to 150% dispersed in a colloidal silica solution containing from 1 to 40% of silica, treating said suspension with finely divided graphite in an amount of up to 300% and forming the resulting suspension into a web, said percentages are based on solids on the dry weight of said fibrous web-forming material.

7. The process set forth in claim 6 wherein the fibers comprise asbestos.

8. The process set forth in claim 6 wherein the fibers comprise cellulose.

9. The process set forth in claim 6 wherein the resin is a powdered B-stage phenol formaldehyde resin.

10. The process for the preparation of a laminating sheet comprising treating an aqueous suspension of inorganic fibers with a dicyandiamide formaldehyde condensation product in an amount of 0.5 to 5%, treating the suspension with a solid resin in an amount of 30 to 150% dispersed in an aqueous colloidal silica solution containing from 1 to 40% of silica, adding a finely divided conductive material in an amount of up to 300% and forming the resulting suspension into a sheet, said percentages being on a solids basis on the dry weight of said fibers.

11. The process as set forth in claim 10 wherein the fibers are asbestos.

12. The process as set forth in claim 10 wherein the resin is a powdered B-stage phenol-formaldehyde resin.

References Cited in the file of this patent

UNITED STATES PATENTS

| | | |
|---|---|---|
| 105,594 | Pemberton | July 19, 1870 |
| 1,230,095 | Baum | June 19, 1917 |
| 2,034,519 | Larson | Mar. 17, 1936 |
| 2,603,624 | Keller | July 15, 1952 |
| 2,632,700 | Niles | Mar. 24, 1953 |
| 2,705,198 | Seybold | Mar. 29, 1955 |
| 2,943,013 | Arledter | June 28, 1960 |

FOREIGN PATENTS

| | | |
|---|---|---|
| 516,322 | Great Britain | Dec. 29, 1939 |
| 208,193 | Switzerland | Apr. 16, 1940 |
| 902,111 | Germany | Jan. 18, 1954 |